(12) United States Patent
Berghegger

(10) Patent No.: US 8,787,043 B2
(45) Date of Patent: Jul. 22, 2014

(54) CONTROLLER FOR A POWER CONVERTER AND METHOD OF OPERATING THE SAME

(75) Inventor: Ralf Schroeder genannt Berghegger, Glandorf (DE)

(73) Assignee: Power Systems Technologies, Ltd., Ebene (MU)

( * ) Notice: Subject to any disclaimer, the term of this patent is extended or adjusted under 35 U.S.C. 154(b) by 392 days.

(21) Appl. No.: 12/692,299

(22) Filed: Jan. 22, 2010

(65) Prior Publication Data

US 2011/0182089 A1 Jul. 28, 2011

(51) Int. Cl.
H02M 3/335 (2006.01)

(52) U.S. Cl.
USPC .................. 363/21.12; 363/21.13

(58) Field of Classification Search
USPC ........... 363/21.02, 21.04, 21.05, 21.12, 21.13
See application file for complete search history.

(56) References Cited

U.S. PATENT DOCUMENTS

| | | | |
|---|---|---|---|
| 1,376,978 A | 5/1921 | Stoekle |
| 2,473,662 A | 6/1949 | Pohm |
| 3,007,060 A | 10/1961 | Guenther |
| 3,346,798 A | 10/1967 | Dinger |
| 3,358,210 A | 12/1967 | Grossoehme |
| 3,433,998 A | 3/1969 | Woelber |
| 3,484,562 A | 12/1969 | Kronfeld |
| 3,553,620 A | 1/1971 | Cielo et al. |
| 3,602,795 A | 8/1971 | Gunn |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,011,498 A | 3/1977 | Hamsra |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |

(Continued)

FOREIGN PATENT DOCUMENTS

| | | |
|---|---|---|
| CN | 101141099 | 3/2008 |
| CN | 101202509 | 6/2008 |

(Continued)

OTHER PUBLICATIONS

Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.

(Continued)

Primary Examiner — Adolf Berhane
Assistant Examiner — Emily Pham
(74) Attorney, Agent, or Firm — Boisbrun Hofman, PLLC

(57) ABSTRACT

A controller for a power converter and method of operating the same. In one embodiment, the controller includes a primary peak current circuit configured to produce a reference voltage corresponding to a primary peak current through a primary winding of a transformer of a power converter, and an offset corrector configured to provide an offset voltage to compensate for delays in the power converter. The controller also includes a summer configured to provide an offset reference voltage as a function of the reference voltage and the offset voltage, and a comparator configured to produce a signal to turn off a power switch coupled to the primary winding of the transformer as a function of the offset reference voltage.

30 Claims, 5 Drawing Sheets

(56) References Cited

U.S. PATENT DOCUMENTS

| | | |
|---|---|---|
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,672,245 A | 6/1987 | Majumdar et al. |
| 4,770,667 A | 9/1988 | Evans et al. |
| 4,770,668 A | 9/1988 | Skoultchi et al. |
| 4,780,653 A | 10/1988 | Bezos et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,055,991 A | 10/1991 | Carroll et al. |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,282,126 A | 1/1994 | Husgen |
| 5,285,396 A | 2/1994 | Aoyama |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,661,642 A | 8/1997 | Shimashita |
| 5,663,876 A | 9/1997 | Newton et al. |
| 5,671,131 A | 9/1997 | Brown |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,383 A | 9/1998 | Lei |
| 5,815,386 A | 9/1998 | Gordon |
| 5,864,110 A | 1/1999 | Moriguchi et al. |
| 5,870,299 A | 2/1999 | Rozman |
| 5,880,942 A | 3/1999 | Leu |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,925,088 A | 7/1999 | Nasu |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A | 11/1999 | Naveed et al. |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,055,166 A | 4/2000 | Jacobs et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,212,084 B1 | 4/2001 | Turner |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 * | 9/2001 | Nakamura et al. ............ 315/307 |
| 6,288,920 B1 | 9/2001 | Jacobs et al. |
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,345,364 B1 | 2/2002 | Lee |

(56) References Cited

U.S. PATENT DOCUMENTS

| | | | |
|---|---|---|---|
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 | 5/2003 | Clark |
| 6,563,725 B2 | 5/2003 | Carsten |
| 6,570,268 B1 | 5/2003 | Perry et al. |
| 6,580,627 B2 | 6/2003 | Toshio |
| 6,597,592 B2 | 7/2003 | Carsten |
| 6,608,768 B2 | 8/2003 | Sula |
| 6,611,132 B2 | 8/2003 | Nakagawa et al. |
| 6,614,206 B1 | 9/2003 | Wong et al. |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,856,149 B2 | 2/2005 | Yang |
| 6,862,194 B2 | 3/2005 | Yang et al. |
| 6,867,678 B2 | 3/2005 | Yang |
| 6,867,986 B2 * | 3/2005 | Amei ................ 363/21.01 |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmermann et al. |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim |
| 7,075,799 B2 | 7/2006 | Qu |
| 7,076,360 B1 | 7/2006 | Ma |
| 7,095,638 B2 | 8/2006 | Uusitalo |
| 7,098,640 B2 | 8/2006 | Brown |
| 7,099,163 B1 * | 8/2006 | Ying .................... 363/21.11 |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,360,004 B2 | 4/2008 | Dougherty et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,385,375 B2 | 6/2008 | Rozman |
| 7,386,404 B2 | 6/2008 | Cargonja et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,462,891 B2 | 12/2008 | Brar et al. |
| 7,468,649 B2 | 12/2008 | Chandrasekaran |
| 7,471,523 B2 | 12/2008 | Yang |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,037 B1 | 7/2009 | Gong et al. |
| 7,558,082 B2 | 7/2009 | Jitaru |
| 7,567,445 B2 | 7/2009 | Coulson et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 * | 8/2010 | Yamashita ........... 363/21.16 |
| 7,778,051 B2 * | 8/2010 | Yang ................... 363/21.18 |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,134,443 B2 | 3/2012 | Chandrasekaran et al. |
| 8,179,699 B2 | 5/2012 | Tumminaro et al. |
| 8,278,889 B2 | 10/2012 | Tateishi |
| 8,638,578 B2 | 1/2014 | Zhang |
| 8,643,222 B2 | 2/2014 | Brinlee et al. |
| 2001/0020886 A1 | 9/2001 | Matsumoto et al. |
| 2001/0024373 A1 | 9/2001 | Cuk |
| 2002/0057080 A1 * | 5/2002 | Telefus et al. ............ 323/283 |

(56) References Cited

U.S. PATENT DOCUMENTS

| | | |
|---|---|---|
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0126512 A1* | 9/2002 | Nakagawa et al. ............. 363/16 |
| 2002/0167385 A1 | 11/2002 | Ackermann |
| 2003/0026115 A1 | 2/2003 | Miyazaki |
| 2003/0030422 A1 | 2/2003 | Sula |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0017689 A1 | 1/2004 | Zhang et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0200631 A1 | 10/2004 | Chen |
| 2004/0201380 A1 | 10/2004 | Zimmermann et al. |
| 2004/0217794 A1 | 11/2004 | Strysko |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2007/0007945 A1 | 1/2007 | King et al. |
| 2007/0010298 A1 | 1/2007 | Chang |
| 2007/0019356 A1 | 1/2007 | Morikawa |
| 2007/0025124 A1 | 2/2007 | Hansson |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Coulson |
| 2007/0274107 A1 | 11/2007 | Garner et al. |
| 2007/0296028 A1 | 12/2007 | Brar et al. |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0024094 A1 | 1/2008 | Nishihara et al. |
| 2008/0024259 A1 | 1/2008 | Chandrasekaran et al. |
| 2008/0031021 A1 | 2/2008 | Ros et al. |
| 2008/0037294 A1 | 2/2008 | Indika de Silva et al. |
| 2008/0043503 A1 | 2/2008 | Yang |
| 2008/0054874 A1 | 3/2008 | Chandrasekaran et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1* | 12/2008 | Tateishi ........................ 363/127 |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0046486 A1 | 2/2009 | Lu et al. |
| 2009/0097290 A1 | 4/2009 | Chandrasekaran |
| 2009/0257250 A1 | 10/2009 | Liu |
| 2009/0273957 A1 | 11/2009 | Feldtkeller |
| 2009/0284994 A1* | 11/2009 | Lin et al. .................... 363/21.13 |
| 2009/0289557 A1 | 11/2009 | Itoh et al. |
| 2009/0310388 A1 | 12/2009 | Yang |
| 2009/0315530 A1 | 12/2009 | Baranwal |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164443 A1* | 7/2010 | Tumminaro et al. .......... 323/247 |
| 2010/0182806 A1 | 7/2010 | Garrity et al. |
| 2010/0188876 A1 | 7/2010 | Garrity et al. |
| 2010/0202165 A1 | 8/2010 | Zheng et al. |
| 2010/0213989 A1 | 8/2010 | Nakatake |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0038179 A1 | 2/2011 | Zhang |
| 2011/0089917 A1 | 4/2011 | Chen et al. |
| 2011/0134664 A1 | 6/2011 | Berghegger |
| 2011/0149607 A1 | 6/2011 | Jungreis et al. |
| 2011/0182089 A1 | 7/2011 | Berghegger |
| 2011/0239008 A1 | 9/2011 | Lam et al. |
| 2011/0241738 A1 | 10/2011 | Tamaoka |
| 2011/0305047 A1 | 12/2011 | Jungreis et al. |
| 2012/0243271 A1 | 9/2012 | Berghegger |
| 2012/0294048 A1 | 11/2012 | Brinlee |

FOREIGN PATENT DOCUMENTS

| | | |
|---|---|---|
| CN | 201252294 | 6/2009 |
| DE | 10310361 | 9/2004 |
| EP | 0665634 | 1/1994 |
| JP | 57097361 | 6/1982 |
| JP | 3-215911 | 9/1991 |
| JP | 2000-68132 | 3/2000 |
| WO | WO8700991 | 2/1987 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

"AN101A: Gate Drive Network for a Power JFET," AN101A.Rev 1.2, Nov. 2003, 2 pp., Lovoltech, Inc., Santa Clara, CA.

"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.

Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.

Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.

(56) References Cited

OTHER PUBLICATIONS

Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Chhawchharia, P., et al., "On the Reduction of Component Count in Switched Capacitor DC/DC Convertors," Hong Kong Polytechnic Univeristy, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Gaye, M., et al., "A 50-100MHz 5V to -5V, 1W Cuk Converter Using Gallium Arsenide Power Switches," ISCAS 2000—IEEE International Symposium on Circuits and System, May 28-31, 2000, pp. I-264-I-267, vol. 1, IEEE, Geneva, Switzerland.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC-DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and HFETs/HEMTs," §5-5: Modulation Doping, 1999, pp. 323-330, John Wiley & Sons, New York, NY.
Maksimović, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Nov. 29, 2001, 8 pages.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LMC7660 Switched Capacitor Voltage Converter," www.national.com, Apr. 1997, 12 pages.
National Semiconductor Corporation, "LM2665 Switched Capacitor Voltage Converter," www.national.com, Sep. 2005, 9 pages.
Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.
Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.
O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.
Pent, C., et al., "A New Efficient High Frequency Rectifier Circuit," Proceedings of 1991 High Frequency Power Conversion (HFPC '91) Conference, Jun. 1991, pp. 236-243, Toronto, CA.
Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.
Plumton, D.L., et al., "A Low On-Resistance High-Current GaAs Power VFET," IEEE Electron Device Letters, Apr. 1995, pp. 142-144, vol. 16, No. 4, IEEE.
Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.
Rico, M., et al., "Static and Dynamic Modeling of Tapped-Inductor DC-to-DC Converters," 1987, pp. 281-288, IEEE, Los Alamitos, CA.
Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.
Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.
Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.
Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.
Texas Instruments Incorporated, "LT1054, LT1054Y Switched-Capacitor Voltage Converters With Regulations," SLVS033C, Feb. 1990—Revised Jul. 1998, 25 pages.
Thaker, M., et al., "Adaptive/Intelligent Control and Power Management Reduce Power Dissipation and Consumption," Digital Power Forum '06, 11 pp., Sep. 2006, Darnell Group, Richardson, TX.
Vallamkonda, S., "Limitations of Switching Voltage Regulators," A Thesis in Electrical Engineering, Texas Tech University, May 2004, 89 pages.
Wei, J., et al., "Comparison of Three Topology Candidates for 12V VRM," IEEE APEC, 2001, pp. 245-251, IEEE, Los Alamitos, CA.
Weitzel, C.E., "RF Power Devices for Wireless Communications," 2002 IEEE MTT-S CDROM, 2002, pp. 285-288, paper TU4B-1, IEEE, Los Alamitos, CA.
Williams, R., "Modern GaAs Processing Methods," 1990, pp. 66-67, Artech House, Inc., Norwood, MA.
Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.
Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.
Xu, P., et al., "Design and Performance Evaluation of Multi-Channel Interleaved Quasi-Square-Wave Buck Voltage Regulator Module," HFPC 2000 Proceedings, Oct. 2000, pp. 82-88.
Xu, P., et al., "Design of 48 V Voltage Regulator Modules with a Novel Integrated Magnetics," IEEE Transactions on Power Electronic, Nov. 2002, pp. 990-998, vol. 17, No. 6, IEEE, Los Alamitos, CA.
Xu, P., et al., "A Family of Novel Interleaved DC/DC Converters for Low-Voltage High-Current Voltage Regulator Module Applica-

(56) References Cited

OTHER PUBLICATIONS tions," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Freescale Semiconductor, "Implementing a Digital AC/DC Switched-Mode Power Supply using a 56F8300 Digital Signal Controller," Application Note AN3115, Aug. 2005, 24 pp., Chandler, AZ.

Freescale Semiconductor, "56F8323 Evaluation Module User Manual, 56F8300 16-bit Digital Signal Controllers", MC56F8323EVMUM, Rev. 2, Jul. 2005 (72 pages).

Freescale Semiconductor, "56F8323/56F8123 Data Sheet Preliminary Technical Data, 56F8300 16-bit Digital Signal Controllers," MC56F8323 Rev. 17, Apr. 2007 (140 pages).

Freescale Semiconductor, "Design of a Digital AC/DC SMPS using the 56F8323 Device, Designer Reference Manual, 56800E 16-bit Digital Signal Controllers", DRM074, Rev. 0, Aug. 2005 (108 pages).

Power Integrations, Inc., "TOP200-4/14 TOPSwitch® Family Three-terminal Off-line PWM Switch," Internet Citation http://www.datasheet4u.com/.download.php?id=311769, Jul. 1996, XP002524650, pp. 1-16.

Bill Andreycak, Active Clamp and Reset Technique Enhances Forward Converter Performance, Oct. 1994, Texas Instruments, 19 pages.

Ridley, R., Designing with the TL431, Switching Power Magazine, Designer Series XV, pp. 1-5, 2005.

\* cited by examiner

CONTROLLER FOR A POWER CONVERTER AND METHOD OF OPERATING THE SAME

TECHNICAL FIELD

The present invention is directed, in general, to power electronics and, more specifically, to a controller for a power converter and method of operating the same.

BACKGROUND

A switched-mode power converter (also referred to as a "power converter" or "regulator") is a power supply or power processing circuit that converts an input voltage waveform into a specified output voltage waveform. DC-DC power converters convert a direct current ("dc") input voltage that may be derived from an alternating current ("ac") source by rectification into a dc output voltage. Controllers associated with the power converters manage an operation thereof by controlling conduction periods of power switches employed therein. Some power converters include a controller coupled between an input and output of the power converter in a feedback loop configuration (also referred to as a "control loop" or "closed control loop") to regulate an output characteristic of the power converter.

Typically, the controller measures the output characteristic (e.g., an output voltage, an output current, or a combination of an output voltage and an output current) of the power converter, and based thereon modifies a duty cycle or an on time (or conduction period) of a power switch of the power converter to regulate the output characteristic. To increase an efficiency of a flyback power converter, a capacitor is coupled across a power switch to limit a voltage of the power switch while a transformer of the power converter is reset when the power switch is turned off. A flyback power train topology may be configured as a quasi-resonant flyback power converter.

In a common application of a flyback power converter, an output current of the power converter is regulated. With conventional design approaches, however, it is difficult to achieve quasi-resonant power converter operation and, at the same time, regulate an output current of the power converter. In one conventional approach, an on time of a diode on a secondary side of the power converter is sensed and a peak value of primary current is held constant, the output current is kept constant by controlling an off time of a power switch on a primary side of the power converter. This process may defeat quasi-resonant switching operation of the power converter.

In another approach, an output current is sensed and a power switch on a primary side of the power converter is controlled employing an optocoupler to transmit a signal of the secondary side of the power converter to a controller referenced to the primary side of the power converter. This approach increases power converter cost due to the presence of the optocoupler. In yet another approach, a regulation of an output current is implemented through the controller by calculating an output current employing an average of input current and a duty cycle of a power switch on a primary side of the power converter. This approach preserves quasi-resonant switching without the need for an optocoupler, but requires a complex calculation in the controller.

Thus, a controller that regulates an output current of a power converter such as a quasi-resonant flyback power converter that preserves primary-to-secondary side isolation of the power converter and efficient quasi-resonant operation still presents unresolved design challenges. Accordingly, what is needed in the art is a design approach and related method to implement a controller for a power converter such as a quasi-resonant flyback power converter without compromising end-product performance, and that can be advantageously adapted to high-volume manufacturing techniques.

SUMMARY OF THE INVENTION

These and other problems are generally solved or circumvented, and technical advantages are generally achieved, by advantageous embodiments of the present invention, including a controller for a power converter and method of operating the same. In one embodiment, the controller includes a primary peak current circuit configured to produce a reference voltage corresponding to a primary peak current through a primary winding of a transformer of a power converter, and an offset corrector configured to provide an offset voltage to compensate for delays in the power converter. The controller also includes a summer configured to provide an offset reference voltage as a function of the reference voltage and the offset voltage, and a comparator configured to produce a signal to turn off a power switch coupled to the primary winding of the transformer as a function of the offset reference voltage.

In a related, but alternative embodiment, a primary peak current circuit of the controller includes a timing circuit configured to estimate a time interval when an output current is delivered to an output of the power converter. The primary peak current circuit also includes a divider configured to multiply a constant with a ratio of a switching frequency of the power switch and the time interval to provide an initial reference voltage. The primary peak current circuit still further includes a limiter configured to limit a value of the initial reference voltage to a predefined range to provide a reference voltage corresponding to a primary peak current through the primary winding of the transformer of the power converter.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a controller for a power converter (e.g., a quasi-resonant flyback power converter) configured to control a power switch thereof by sensing signals in the power converter such as on the primary side of the power converter. While the principles of the present invention will be described in the environment of a power converter, any application that may benefit from a power converter including a motor drive or a power amplifier is well within the broad scope of the present invention.

Figure 1:
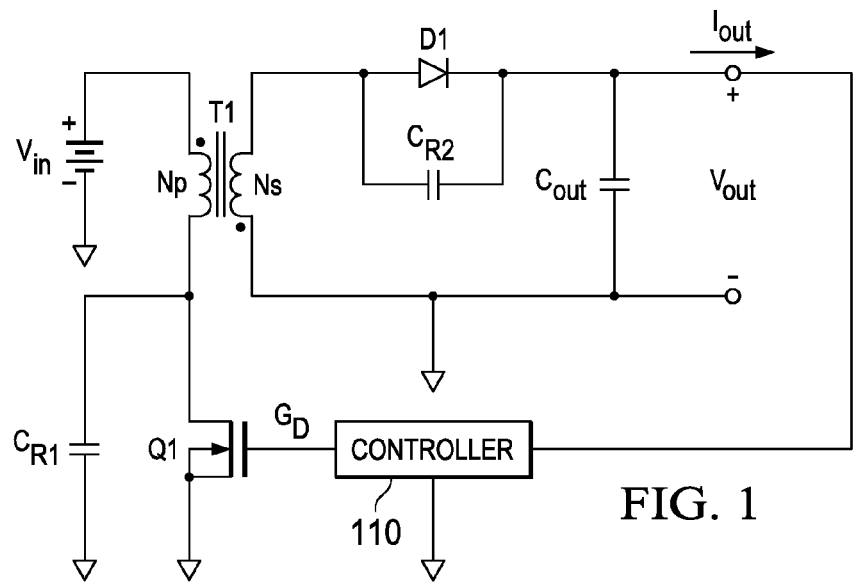
FIG. 1 illustrates a schematic diagram of an embodiment of portions of a power converter that provides an environment for application of the present invention.

Turning now to FIG. 1, illustrated is a schematic diagram of an embodiment of portions of a power converter (e.g., a quasi-resonant flyback power converter) that provides an environment for application of the present invention. A power train of the power converter includes a power switch Q1 coupled to a source of electrical power such as a dc input power source that provides an input voltage $V_{in}$, represented by a battery. The dc input power source supplies input power to an isolating transformer or transformer T1. The transformer T1 has primary winding with primary turns Np and a secondary winding with secondary turns Ns that are selected to provide an output voltage $V_{out}$ with consideration of a resulting duty cycle and stress on power train components. The power switch Q1 (e.g., an n-channel metal-oxide semiconductor field-effect transistor ("MOSFET")) is controlled by a controller (e.g., a pulse-width modulation ("PWM") controller) 110 that periodically controls the power switch Q1 to be conducting for a duty cycle D with a frequency $f_s$.

When the power switch Q1 is switched off, energy stored in magnetizing and leakage inductances of transformer T1 causes a current to continue flowing in the primary winding of the transformer T1 that produces a charge in a primary resonant capacitor $C_{R1}$. A voltage built up across terminals of the primary resonant capacitor $C_{R1}$ contributes to resetting the magnetic flux in the core of transformer T1. The power switch Q1 conducts alternately with the switching frequency $f_s$ in response to a gate-drive signal $G_D$ produced by the PWM controller 110. The duty cycle D is adjusted by the PWM controller 110 to regulate an output characteristic of the power converter such as output voltage $V_{out}$, an output current $I_{out}$, or a combination of the two. Energy stored in the magnetizing inductance of transformer T1 also produces a pulsating forward current in a diode D1 that provides an output current $I_{out}$ of the power converter. The ac voltage appearing on the secondary winding of the transformer T1 is rectified by the diode D1, and the dc component of the resulting waveform is coupled to the output of the power converter through a low-pass output filter formed with an output filter capacitor Cout to produce the output voltage $V_{out}$. A secondary resonant capacitor $C_{R2}$ is also frequently coupled across terminals of the diode D1 in a quasi-resonant flyback power converter to limit a peak inverse voltage produced across terminals of the diode D1 when the power switch Q1 is turned on.

In general, the duty cycle D of the power switch Q1 may be adjusted by the PWM controller 110 to maintain a regulation of the output voltage $V_{out}$ or the output current $I_{out}$ of the power converter. Those skilled in the art should understand that the PWM controller 110 may include an isolation device such as an optocoupler with its attendant cost to provide metallic isolation between the primary and secondary sides of the power converter.

Figure 2:
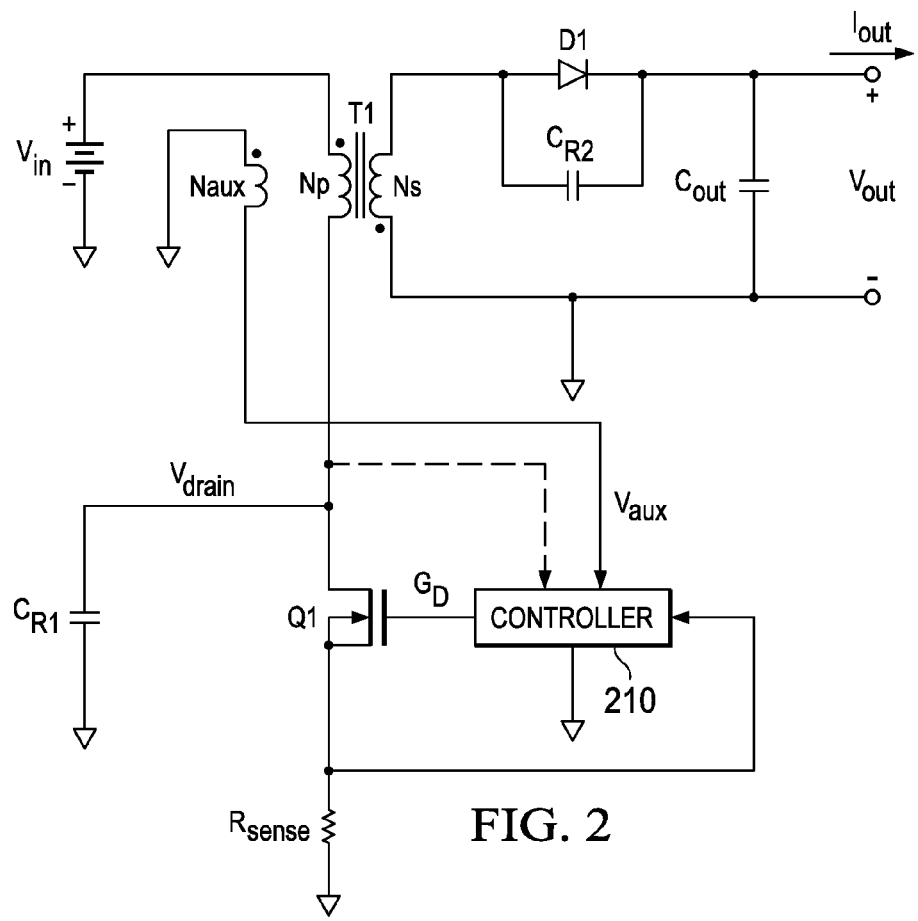
FIG. 2 illustrates a schematic diagram of an embodiment of a power converter including a controller constructed according to the principles of the present invention.

Turning now to FIG. 2, illustrated is a schematic diagram of an embodiment of a power converter (e.g., a quasi-resonant flyback power converter) including a controller (e.g., a PWM controller) 210 constructed according to the principles of the present invention. The PWM controller 210 senses a current in a power switch Q1 employing a sense resistor $R_{sense}$ coupled in series with a source of the power switch Q1, illustrated in FIG. 2 as a MOSFET. In an alternative embodiment, a current in the power switch Q1 may be sensed with a current-sense transformer, employing circuit structures well known in the art. The PWM controller 210 also senses a drain voltage $V_{drain}$ of the power switch Q1. In an alternative embodiment, the PWM controller 210 senses an auxiliary voltage $V_{aux}$ across an auxiliary winding $N_{aux}$ of a transformer T1 in lieu of the drain voltage $V_{drain}$.

The PWM controller 210 regulates an output current $I_{out}$ of the power converter. To calculate the primary peak current Ip through a primary winding of a transformer T1 to control an on time of the power switch Q1, the PWM controller 210 estimates a time interval $t_{sec}$, of current flow in the secondary winding of the transformer T1 through a diode D1 to an output filter capacitor Cout, and the duration of one switching cycle $t_s=1/f_s$. The duration of one switching cycle $t_s$ is generally known by the PWM controller 210 because the PWM controller 210 initiates the beginning of each switching cycle.

The average output current is calculated employing equation (1):

$$I_{out}=Ip \cdot (t_{sec}/t_s) \cdot (Np/Ns) \cdot \eta/2 \qquad (1)$$

where Ip=primary peak current,
 $I_{out}$=average output current that is desired to be controlled,
 Np=number of primary turns of the primary winding of the transformer T1,
 Ns=number of secondary turns of the secondary winding of the transformer T1, and
 η=power conversion efficiency.

The primary and secondary turns Np, Ns are generally constant, and efficiency η is effectively constant over a range of output currents $I_{out}$ and is generally known from modeling and prototype models of the power converter. Thus, the primary peak current Ip for a constant output current $I_{out}$ can be represented by equation (2):

$$Ip=(t_s/t_{sec}) \cdot k \qquad (2)$$

where the parameter k is a constant representative of the particular power converter design. Thus, if the primary peak current Ip is controlled to be proportional to $t_s/t_{sec}$, the output current $I_{out}$ of the power converter will be constant. For an explanation of the other components of the power converter, see the description of the power converter illustrated with respect to FIG. 1.

Figure 3:
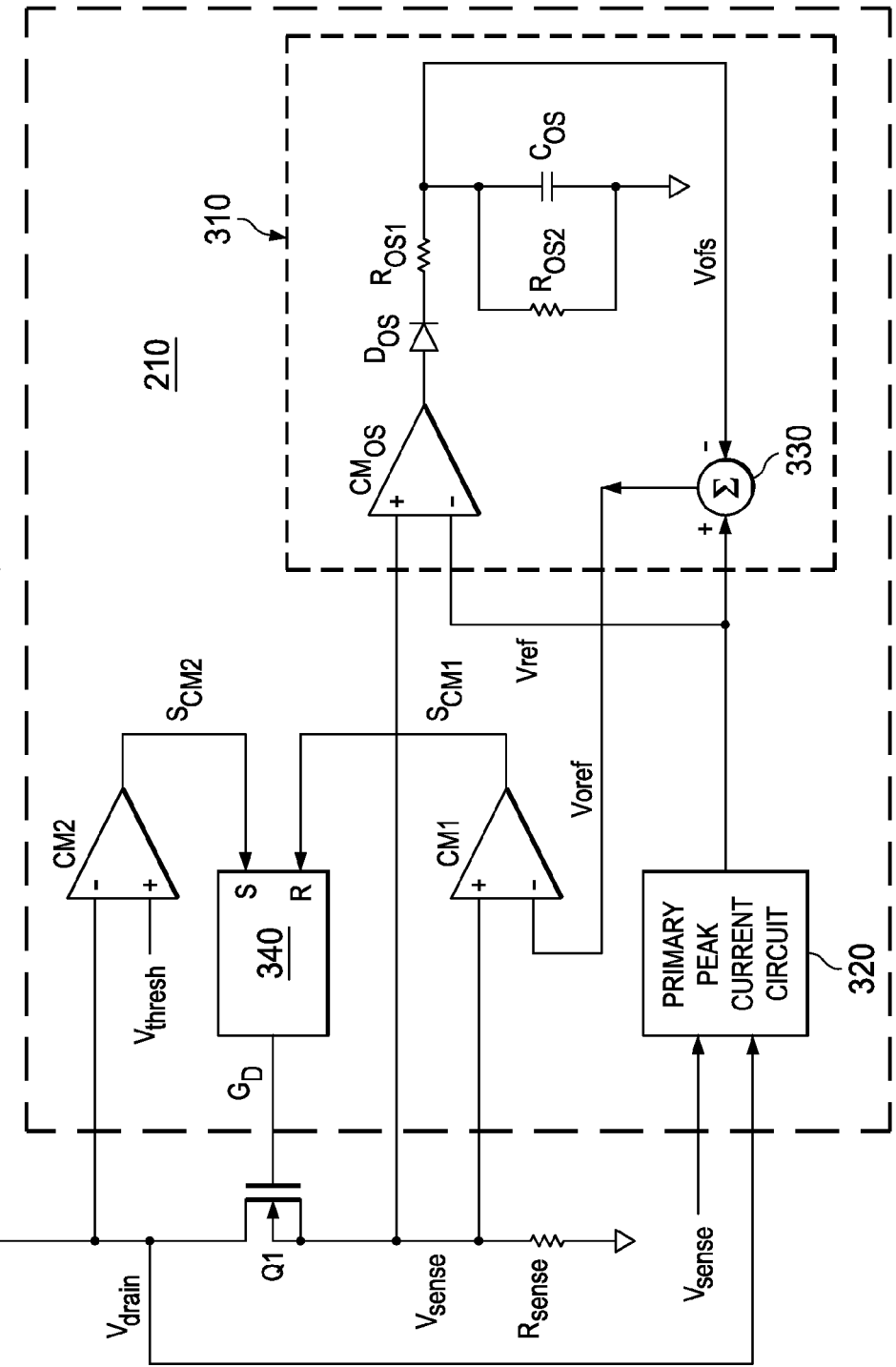
FIGS. 3 and 4 illustrate schematic diagrams of portions of the power converter of FIG. 2, introducing embodiments of a controller constructed according to the principles of the present invention.

Turning now to FIG. 3, illustrated is a schematic diagram of portions of the power converter of FIG. 2, introducing an embodiment of a controller (e.g., the PWM controller) 210 constructed according to the principles of the present invention. The controller 210 includes a first and second comparators CM1, CM2, an offset corrector 310, a primary peak current circuit 320, a summer 330 and a set-reset ("S-R") flip-flop 340. To initiate conduction of the power switch Q1, the S-R flip-flop 340 turns on the power switch Q1 (via a gate-drive signal $G_D$) in response to a signal $S_{CM2}$ from the second comparator CM2 detecting a drain voltage $V_{drain}$ of the power switch Q1 falling below a threshold voltage $V_{thresh}$, which occurs upon termination of current flow in the secondary winding of the transformer T1 of the power converter. Termination of current flow in the secondary winding of the transformer T1 is described further hereinbelow with reference to FIG. 5.

To terminate conduction of the power switch Q1, thereby setting the primary peak current Ip through the primary winding of the transformer T1 to the correct value to produce the desired output current $I_{out}$, the first comparator CM1 compares a sense voltage $V_{sense}$ at a sense resistor $R_{sense}$ in series with the power switch Q1 with an offset reference voltage Voref produced by a primary peak current circuit 320 and corrected by an offset corrector 310. The sense voltage $V_{sense}$ at the sense resistor $R_{sense}$ is proportional to the primary peak current Ip that flows through the primary winding of the transformer T1. The output of the first comparator CM1 is coupled to a reset input of the S-R flip-flop 340. When the sense voltage $V_{sense}$ at the sense resistor $R_{sense}$ exceeds the offset reference voltage Voref, the power switch Q1 is turned off by the action of a signal $S_{CM1}$ from the first comparator CM1 to the S-R flip-flop 340 and a gate-drive signal $G_D$ from the S-R flip-flop 340 to the power switch Q1.

Two reference voltages are calculated according to equations (3) and (4):

$$V\text{ref}=(I_{out}/\eta)(t_s/t_{sec})R_{sense}*2 \quad (3)$$

$$V\text{oref}=V\text{ref}-V\text{ofs} \quad (4)$$

wherein $I_{out}$ corresponds to a desired output current of the power converter, $\eta$ is the assumed power conversion efficiency, and Vofs is an offset voltage that compensates the generally unknown power converter delays. The primary peak current circuit 320 provides computation of the reference voltage Vref according to equation (3). The summer 330 provides subtraction according to equation (4). It should be understood that analog and/or digital circuits may perform the computation described by equation (3) in accordance with the primary peak current circuit 320. For example, an integrated circuit designated AD534 produced by Analog Devices, Inc. and described in data sheet entitled "Internally Trimmed Precision IC Multiplier," 1999, which is incorporated herein by reference, can be employed to perform the calculation of equation (3).

The offset corrector 310 provides a mechanism to compensate for the uncertain delays in the power converter elements such as the first comparator CM1 and the turn-on time of the power switch Q1. The offset corrector 310 computes the value of the offset voltage Vofs to provide this compensation. When the sense voltage $V_{sense}$ exceeds the reference voltage Vref, then the output of an offset comparator $CM_{OS}$ provides a current to an offset capacitor $C_{OS}$ through an offset diode $D_{OS}$ and a first offset resistor $R_{OS2}$, thereby incrementing the voltage across terminals of the offset capacitor $C_{OS}$. The voltage across the terminals of the offset capacitor $C_{OS}$ is continually decreased by a second offset resistor $R_{OS2}$. As a result, if the sense voltage $V_{sense}$ (e.g., maximum sense voltage $V_{sense}$) at the sense resistor $R_{sense}$ exceeds the reference voltage Vref during a switching cycle, then the offset voltage Vofs is increased. If the sense voltage $V_{sense}$ (e.g., maximum sense voltage $V_{sense}$) at the sense resistor $R_{sense}$ does not exceed the reference voltage Vref during a switching cycle, the offset voltage Vofs is slowly decreased. Thus, the offset voltage Vofs is a function of the reference voltage Vref and the sense voltage $V_{sense}$. In this manner, the output of the offset corrector 310 is continually adjusted so that the peak value of the sense voltage $V_{sense}$ slightly exceeds the reference voltage Vref computed in the primary peak current circuit 320. The offset corrector 310 thereby compensates for uncertain delays in the power converter.

Figure 4:
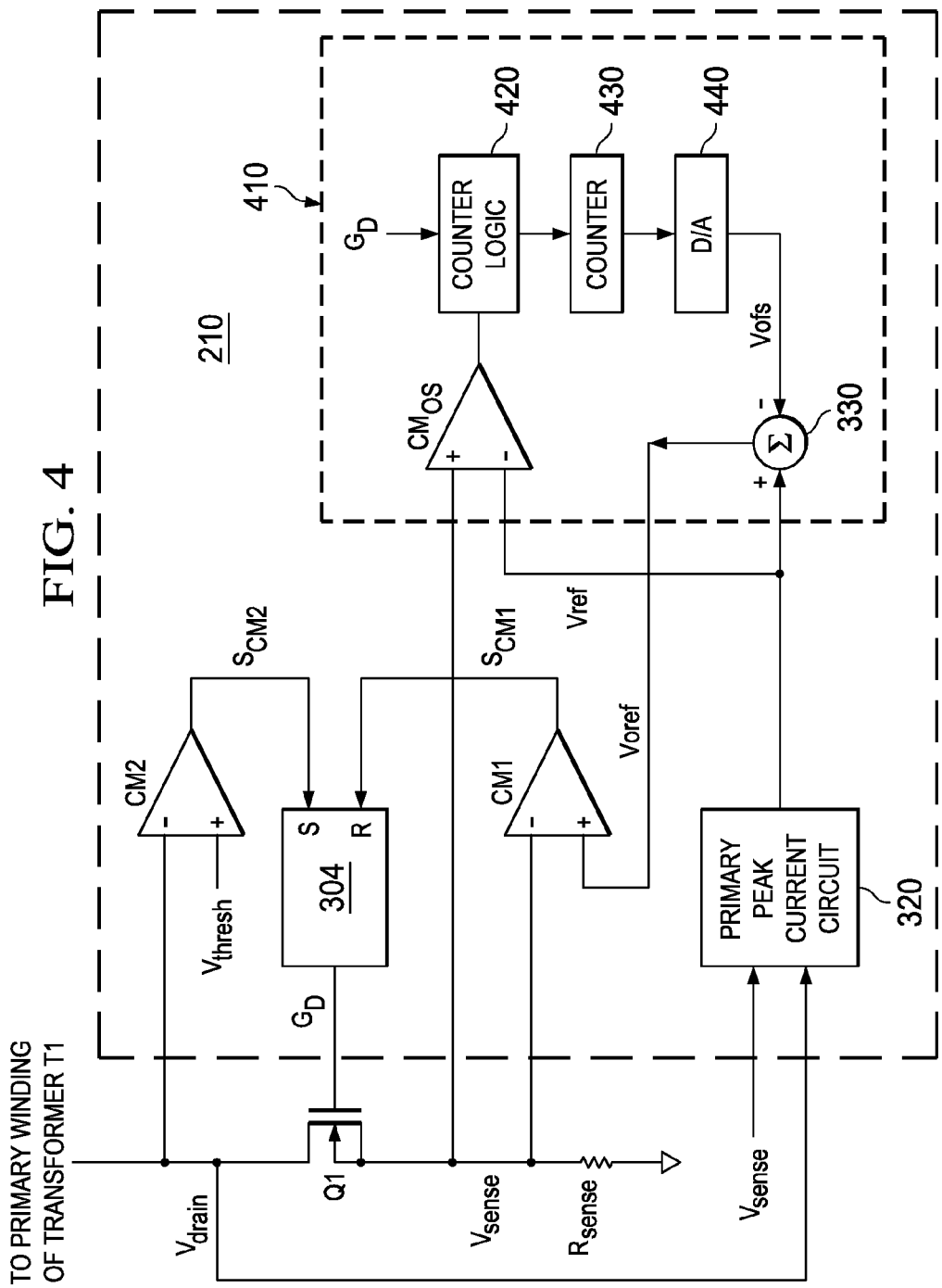

Turning now to FIG. 4, illustrated is a schematic diagram of portions of the power converter of FIG. 2, introducing an embodiment of a controller (e.g., the PWM controller) 210 constructed according to the principles of the present invention. In this embodiment, the offset voltage Vofs is detected with a peak-sensing circuit that employs a counter 430 to provide compensation and adjustment of a sense voltage $V_{sense}$ (e.g., maximum sense voltage $V_{sense}$) at the sense resistor $R_{sense}$ during each switching cycle. If an offset comparator $CM_{OS}$ detects the sense voltage $V_{sense}$ exceeds a reference voltage Vref during a switching cycle, then a counter logic 420 increments the counter 430. If the sense voltage $V_{sense}$ does not exceed the reference voltage Vref during a switching cycle, then the counter logic 420 decrements the counter 430. A digital-to-analog ("D/A") converter 440 converts the stored value in the counter 430 to an analog offset voltage Vofs, which is then coupled to a summer 330. As a result, the offset corrector 410 compensates for uncertain circuit delays. For an explanation of the other components of the controller, see the description of the controller illustrated with respect to FIG. 3.

Figure 5:
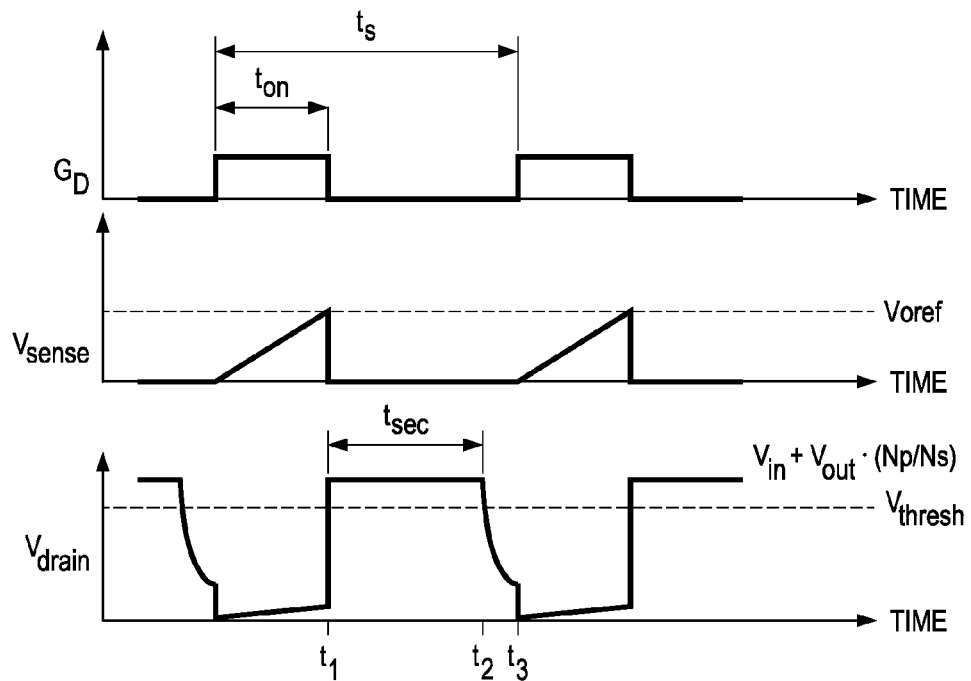
FIG. 5 illustrates a graphical representation of selected waveforms demonstrating an exemplary operation of a power converter according to the principles of the present invention.

Turning now to FIG. 5, illustrated is a graphical representation of selected waveforms demonstrating an exemplary operation of a power converter (e.g., the quasi-resonant flyback power converter of FIG. 2) according to the principles of the present invention. A waveform of a gate-drive signal $G_D$ provides an on time $t_{on}$ for a power switch Q1 with a switching period $t_s$. FIG. 5 also illustrates waveforms of a sense voltage $V_{sense}$ of a sense resistor $R_{sense}$ and a drain voltage $V_{drain}$ of the power switch Q1. When the sense voltage $V_{sense}$ exceeds an offset reference voltage Voref, the on time $t_{on}$ of the power switch Q1 is terminated. When the power switch Q1 is turned off at the time $t_1$ and current is delivered to an output filter capacitor Cout through a diode D1 due to energy stored in the magnetizing inductance of a transformer T1, the drain voltage rises to a level:

$$V_{in}+V_{out}\cdot(Np/Ns).$$

When the energy stored in the magnetizing inductance of transformer T1 is exhausted, the drain voltage $V_{drain}$ falls below a threshold voltage $V_{thresh}$ at time $t_2$, and reaches a value such as a minimum value at time $t_3$. At the time $t_3$, the controller initiates a new switching cycle. The time interval beginning at the time $t_1$ and terminating at the time $t_2$ defines the time interval $t_{sec}$ during which current flows through the diode D1 to an output of the power converter via the output filter capacitor Cout.

Figure 6:
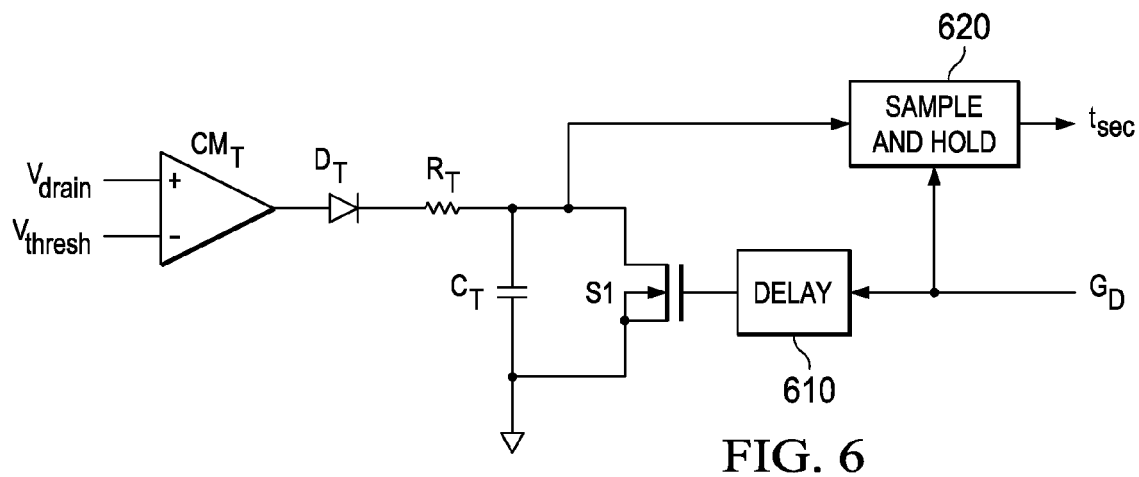
FIGS. 6 to 8 illustrate diagrams of embodiments of portions of a primary peak current circuit employable with a power converter constructed according to the principles of the present invention.
Figure 7:
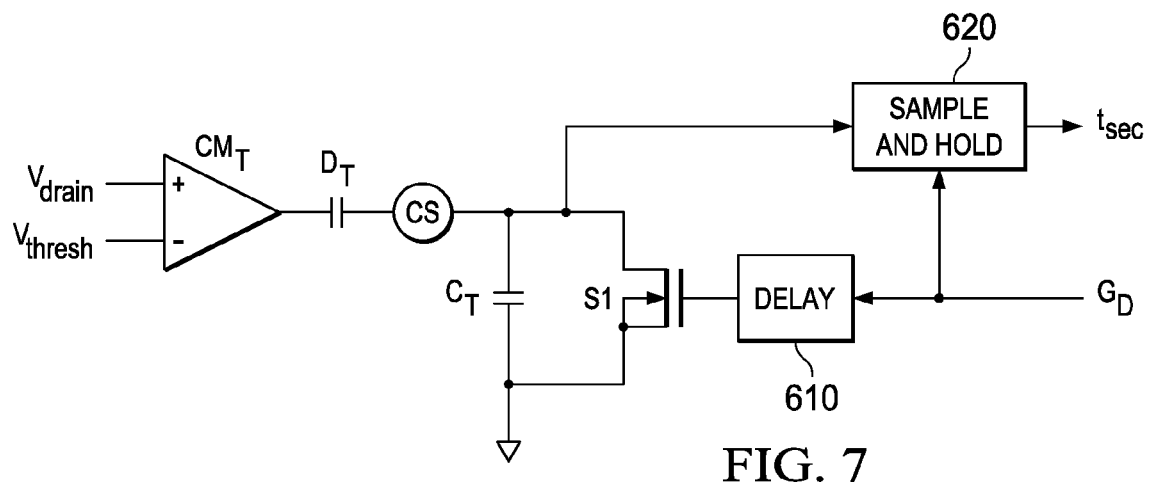

Turning now to FIGS. 6 and 7, illustrated are schematic diagrams of embodiments of a portion of a primary peak current circuit (see, e.g., FIGS. 3 and 4) employable with a power converter (e.g., the quasi-resonant flyback power converter of FIG. 2) constructed according to the principles of the present invention. Beginning with FIG. 6, a timing circuit may be incorporated into the primary peak current circuit and estimates a time interval $t_{sec}$ during which an output current is delivered to an output of the power converter via an output filter capacitor Cout due to energy stored in the magnetizing inductance of a transformer T1. A timing comparator $CM_T$ compares a drain voltage $V_{drain}$ with a threshold voltage $V_{thresh}$ as described above with respect to FIG. 5. When the drain voltage $V_{drain}$ exceeds the threshold voltage $V_{thresh}$ the timing comparator $CM_T$ provides current to a timing capacitor $C_T$ through a timing diode $D_T$ and a timing resistor $R_T$. Accordingly, the voltage across the timing capacitor $C_T$ increases at a rate that may be represented by the equation:

$$dV/dt = i_{RT}/C_T,$$

wherein,
 dV/dt is the rate at which the voltage across the timing capacitor $C_T$ increases,
 $i_{RT}$ is the current through the timing diode $D_T$ and the timing resistor $R_T$, which can be estimated from the output voltage of the timing comparator $CM_T$ minus the voltage across the timing capacitor $C_T$ and minus the forward voltage drop of the timing diode $D_T$, and
 $C_T$ in the equation above represents the capacitance of the timing capacitor $C_T$.

Thus, the timing capacitor $C_T$ performs an integration of the current that flows thereto. Preferably, the R·C time constant of the timing resistor $R_T$ and the timing capacitor $C_T$ is long enough to obtain reasonably accurate integration of the current flowing into the timing capacitor $C_T$. A sample-and-hold circuit 620 acquires a voltage such as the maximum voltage across the timing capacitor $C_T$, which is proportional to the time interval $t_{sec}$. The sample-and-hold circuit 620 accordingly produces an estimate of the time interval $t_{sec}$. A control switch S1, illustrated in FIG. 6 as a MOSFET, is coupled to a gate-drive signal GD and periodically discharges the timing capacitor $C_T$ to enable the integration performed in the timing capacitor $C_T$ to start over (i.e., the control switch S1 resets the integration operation). A delay circuit 610 enables the sample-and-hold circuit 620 to acquire the voltage such as the maximum voltage across the timing capacitor $C_T$ before the timing capacitor $C_T$ is discharged by the control switch S1.

Additionally, and as illustrated in the timing circuit of FIG. 7, a constant current source CS may be employed in lieu of the timing resistor $R_T$ to augment an accuracy of current control and a similar circuit as described herein may be employed to estimate a switching cycle $t_s$ of a power switch of a power converter employing the primary peak current circuit (see, e.g., FIGS. 2 to 4). Assuming a timing circuit with a current source CS as described herein is employed to estimate the time interval $t_{sec}$ and the switching cycle $t_s$, the values of the current source CS and the timing capacitor $C_T$ should substantially match for purposes of low tolerance. While the absolute values of the time constants for both timing circuits (i.e., one timing circuit to estimate the time interval $t_{sec}$ and another timing circuit to estimate the switching cycle $t_s$) may differ, the ratio of the time constants should be substantially constant. As a result, the timing circuits and primary peak current circuit may be embodied in an integrated circuit (e.g., an application specific integrated circuit) because matching components in such integrated circuits is quite achievable while still maintaining high absolute tolerances.

Figure 8:
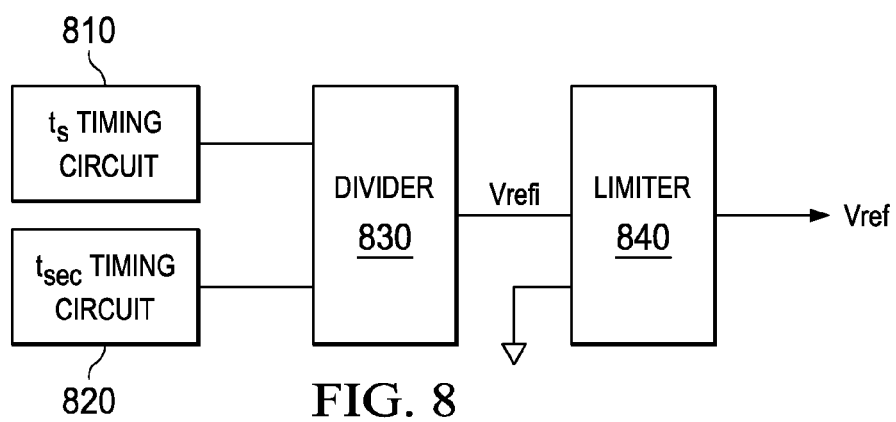

Turning now to FIG. 8, illustrated is a block diagram of an embodiment of a portion of a primary peak current circuit (see, e.g., FIGS. 3 and 4) employable with a power converter (e.g., the quasi-resonant flyback power converter of FIG. 2) configured to provide a reference voltage Vref in accordance with a switching cycle $t_s$ of a power switch of the power converter and a time interval $t_{sec}$ during which an output current is delivered to an output of the power converter. The primary peak current circuit to provide the reference voltage Vref includes a switching cycle timing circuit 810 and a time interval timing circuit 820 analogous to the timing circuit illustrated and described with respect to FIGS. 6 and 7. The primary peak current circuit to provide the reference voltage Vref also includes a divider 830 and a limiter 840. The divider 830 multiples a constant "k" with a ratio of $t_s/t_{sec}$ to provide an initial reference voltage Vrefi, wherein the constant "k" is expressed as a voltage as illustrated in equation (3) above. The limiter 840 thereafter limits a value of the initial reference voltage Vrefi to a predefined range to provide the reference voltage Vref. As a result, the reference voltage Vref is limited to prevent too high of a primary peak current during, for instance, a start up of the power converter when the values of the switching cycle $t_s$ and the time interval $t_{sec}$ are not available.

Thus, a controller for a power converter (e.g., a quasi-resonant flyback power converter) has been introduced that controls a power switch thereof. In one embodiment, the controller includes a primary peak current circuit configured to produce a reference voltage corresponding to a primary peak current through a primary winding of a transformer of a power converter, and an offset corrector configured to provide an offset voltage to compensate for delays in the power converter. The offset voltage may be a function of the reference voltage from the primary peak current circuit and a sense voltage from a sense resistor in series with the power switch. The offset corrector may include an offset comparator, an offset capacitor, an offset diode and an offset resistor or, alternatively, an offset comparator, a counter, counter logic and a digital-to-analog converter.

The controller also includes a summer configured to provide an offset reference voltage as a function of the reference voltage and the offset voltage, and a comparator configured to produce a signal to turn off the power switch coupled to the primary winding of the transformer as a function of the offset reference voltage. The comparator is configured to produce the signal to turn off the power switch when a sense voltage from a sense resistor in series with the power switch exceeds the offset reference voltage. The controller further includes a set-reset flip-flop configured to provide a gate drive signal to the power switch responsive to the signal from the comparator. The set-reset flip-flop is also configured to turn on the power switch responsive to a signal from another comparator detecting a drain voltage of the power switch falling below a threshold voltage.

In a related, but alternative embodiment, a primary peak current circuit of the controller includes a timing circuit configured to estimate a time interval when an output current is delivered to an output of the power converter. The primary peak current circuit also includes a divider configured to multiply a constant with a ratio of a switching frequency of the power switch and the time interval to provide an initial reference voltage. The constant may include a desired output current of the power converter divided by a power conversion efficiency of the power converter. The primary peak current circuit still further includes a limiter configured to limit a value of the initial reference voltage to a predefined range to provide a reference voltage corresponding to a primary peak current through the primary winding of the transformer of the power converter.

The timing circuit of the primary peak current circuit includes a comparator configured to provide a current to a timing capacitor when a drain voltage of the power switch exceeds a threshold voltage, wherein the timing capacitor is configured to perform an integration of the current. The primary peak current circuit also includes a sample-and-hold circuit configured to acquire a voltage across the timing capacitor that is proportional to and produces the estimate of the time interval, and a control switch configured to discharge the timing capacitor to enable the integration to start over as a function of a gate drive signal to the power switch. The primary peak current circuit still further includes a delay circuit configured to enable the sample-and-hold circuit to acquire the voltage across the timing capacitor before the timing capacitor is discharged by the control switch. The comparator is configured to provide the current to the timing capacitor through a timing resistor or a current source when the drain voltage of the power switch exceeds the threshold voltage. Additionally, the primary peak current circuit may include a timing circuit configured to estimate the switching frequency of the power switch.

Those skilled in the art should understand that the previously described embodiments of a controller for a power converter configured to control a power switch and related methods of operating the same are submitted for illustrative purposes only. While a controller has been described in the environment of a power converter, these processes may also be applied to other systems such as, without limitation, a power amplifier or a motor controller, which are broadly included herein in the term "power converter."

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991).

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A primary peak current circuit employable with a power converter having a transformer with a primary winding coupled to a power switch and a secondary winding coupled to an output thereof, comprising:
    a timing circuit configured to estimate a time interval when an output current is delivered to an output of said power converter; and
    a divider configured to multiply a constant, comprising a desired output current of said power converter divided by a power converter efficiency of said power converter, with a ratio of a switching frequency of said power switch and said time interval to provide an initial reference voltage corresponding to a primary peak current through said primary winding.

2. The primary peak current circuit as recited in claim 1 further comprising a limiter configured to limit a value of said initial reference voltage to a predefined range to provide a reference voltage corresponding to said primary peak current through said primary winding.

3. The primary peak current circuit as recited in claim 1 wherein said timing circuit comprises:
    a comparator configured to provide a current to a timing capacitor when a drain voltage of said power switch exceeds a threshold voltage, said timing capacitor being configured to perform an integration of said current,
    a sample-and-hold circuit configured to acquire a voltage across said timing capacitor that is proportional to and produces said estimate of said time interval,
    a control switch configured to discharge said timing capacitor to enable said integration to start over as a function of a gate drive signal to said power switch, and
    a delay circuit configured to enable said sample-and-hold circuit to acquire said voltage across said timing capacitor before said timing capacitor is discharged by said control switch.

4. The primary peak current circuit as recited in claim 3 wherein said comparator is configured to provide said current to said timing capacitor through a timing resistor when said drain voltage of said power switch exceeds said threshold voltage.

5. The primary peak current circuit as recited in claim 3 wherein said comparator is configured to provide said current to said timing capacitor through a current source when said drain voltage of said power switch exceeds said threshold voltage.

6. The primary peak current circuit as recited in claim 1 wherein said constant comprises a value of a sense resistor in series with said power switch.

7. The primary peak current circuit as recited in claim 1 further comprising a timing circuit configured to estimate said switching frequency of said power switch.

8. A controller employable with a power converter having a transformer with a primary winding coupled to a power switch and a secondary winding coupled to an output thereof, comprising:
    a primary peak current circuit configured to produce a reference voltage corresponding to a primary peak current through said primary winding of said transformer;
    an offset corrector configured to provide an offset voltage to compensate for delays in said power converter, said offset voltage being a function of said reference voltage from said primary peak current circuit and a sense voltage from a sense resistor in series with said power switch;
    a summer configured to provide an offset reference voltage as a function of said reference voltage and said offset voltage; and
    a comparator configured to produce a signal to turn off said power switch as a function of said offset reference voltage.

9. The controller as recited in claim 8 wherein said primary peak current circuit comprises at least one timing circuit, a divider and a limiter.

10. The controller as recited in claim 8 wherein said primary peak current circuit is configured to produce said reference voltage as a function of a switching cycle of said power switch and a time interval during which an output current is delivered to said output of said power converter.

11. The controller as recited in claim 8 wherein said comparator is configured to produce said signal to turn off said power switch when said sense voltage from said sense resistor in series with said power switch exceeds said offset reference voltage.

12. The controller as recited in claim 8 wherein said offset corrector comprises an offset comparator, an offset capacitor, an offset diode and an offset resistor.

13. The controller as recited in claim 8 wherein said offset corrector comprises an offset comparator, a counter, a counter logic and a digital-to-analog converter.

14. The controller as recited in claim 8 further comprising a set-reset flip-flop configured to provide a gate drive signal to said power switch responsive to said signal from said comparator.

15. The controller as recited in claim 8 further comprising a set-reset flip-flop configured to turn on said power switch responsive to a signal from another comparator detecting a drain voltage of said power switch falling below a threshold voltage.

16. A method of operating a controller employable with a power converter having a transformer with a primary winding coupled to a power switch and a secondary winding coupled to an output thereof, comprising:
producing a reference voltage corresponding to a primary peak current through said primary winding of said transformer;
providing an offset voltage to compensate for delays in said power converter, said offset voltage being a function of said reference voltage and a sense voltage from a sense resistor in series with said power switch;
providing an offset reference voltage as a function of said reference voltage and said offset voltage; and
producing a signal to turn off said power switch as a function of said offset reference voltage.

17. The method as recited in claim 16 wherein producing said reference voltage is a function of a switching cycle of said power switch and a time interval during which an output current is delivered to said output of said power converter.

18. The method as recited in claim 16 wherein said producing said signal to turn off said power switch occurs when said sense voltage from said sense resistor in series with said power switch exceeds said offset reference voltage.

19. The method as recited in claim 16 further comprising providing a gate drive signal to said power switch responsive to said producing said signal to turn off said power switch.

20. The method as recited in claim 16 further comprising turning on said power switch responsive to a signal detecting a drain voltage of said power switch falling below a threshold voltage.

21. A power converter, comprising:
a transformer having a primary winding coupled to a power switch and a secondary winding coupled to an output thereof; and
a controller, including:
a primary peak current circuit configured to produce a reference voltage corresponding to a primary peak current through said primary winding of said transformer,
an offset corrector configured to provide an offset voltage to compensate for delays in said power converter, said offset voltage being a function of said reference voltage from said primary peak current circuit and a sense voltage from a sense resistor in series with said power switch,
a summer configured to provide an offset reference voltage as a function of said reference voltage and said offset voltage, and
a comparator configured to produce a signal to turn off said power switch as a function of said offset reference voltage.

22. The power converter as recited in claim 21 wherein said primary peak current circuit includes at least one timing circuit, a divider and a limiter.

23. The power converter as recited in claim 21 wherein said primary peak current circuit is configured to produce said reference voltage as a function of a switching cycle of said power switch and a time interval during which an output current is delivered to said output of said power converter.

24. The power converter as recited in claim 21 wherein said comparator is configured to produce said signal to turn off said power switch when said sense voltage from said sense resistor in series with said power switch exceeds said offset reference voltage.

25. The power converter as recited in claim 21 wherein said offset corrector includes an offset comparator, an offset capacitor, an offset diode and an offset resistor.

26. The power converter as recited in claim 21 wherein said offset corrector includes an offset comparator, a counter, a counter logic and a digital-to-analog converter.

27. The power converter as recited in claim 21 wherein said controller further includes a set-reset flip-flop configured to provide a gate drive signal to said power switch responsive to said signal from said comparator.

28. The power converter as recited in claim 21 wherein said controller further includes a set-reset flip-flop configured to turn on said power switch responsive to a signal from another comparator detecting a drain voltage of said power switch falling below a threshold voltage.

29. The power converter as recited in claim 21 wherein said controller is a pulse-width modulator controller.

30. The power converter as recited in claim 21 wherein said power converter is a quasi-resonant flyback power converter.

* * * * *